US012587395B2

(12) United States Patent
Navarro et al.

(10) Patent No.: US 12,587,395 B2
(45) Date of Patent: Mar. 24, 2026

(54) SYSTEMS AND METHODS FOR PERFORMING AN ACTION ON A DIGITAL ASSET

(71) Applicant: The Toronto-Dominion Bank, Toronto (CA)

(72) Inventors: Miguel Navarro, Ewing, NJ (US); Levi Sutter, Westampton, NJ (US); Joseph S. Sansotta, Langhorne, PA (US); Mohamed Abbas, Jersey City, NJ (US)

(73) Assignee: The Toronto-Dominion Bank

(*) Notice: Subject to any disclaimer, the term of this patent is extended or adjusted under 35 U.S.C. 154(b) by 432 days.

(21) Appl. No.: 17/887,564

(22) Filed: Aug. 15, 2022

(65) Prior Publication Data

US 2024/0056319 A1 Feb. 15, 2024

(51) Int. Cl.
| | |
|---|---|
| *H04L 9/00* | (2022.01) |
| *G06F 21/62* | (2013.01) |
| *G06Q 20/34* | (2012.01) |

(52) U.S. Cl.
CPC ............ *H04L 9/50* (2022.05); *G06F 21/6218* (2013.01); *G06Q 20/34* (2013.01)

(58) Field of Classification Search
CPC ... H04L 9/50; H04L 2209/56; G06F 21/6218; G06Q 20/34; G06Q 20/36; G06Q 20/389
See application file for complete search history.

(56) References Cited

U.S. PATENT DOCUMENTS

| | | | |
|---|---|---|---|
| 9,590,989 B2 | 3/2017 | Spagnola | |
| 10,513,077 B2 | 12/2019 | Mattingly et al. | |

| | | | | |
|---|---|---|---|---|
| 2017/0324711 A1 | 11/2017 | Feeney et al. | | |
| 2019/0180291 A1 | 6/2019 | Schmeling et al. | | |
| 2019/0373137 A1 | 12/2019 | Krukar et al. | | |
| 2022/0292490 A1* | 9/2022 | Collen | .............. | G06Q 20/3672 |
| 2022/0300918 A1* | 9/2022 | Yan | ..................... | G06Q 20/4037 |

(Continued)

FOREIGN PATENT DOCUMENTS

| | | |
|---|---|---|
| IN | 201921050589 | 7/2021 |
| KR | 1020200046260 | 5/2020 |

OTHER PUBLICATIONS

Matica Group; Instant Issuance Solution; Published in Matica; https://www.maticacorp.com/instant-issuance/; Accessed Jun. 3, 2022.

(Continued)

*Primary Examiner* — Han Yang
(74) *Attorney, Agent, or Firm* — Rowand LLP

(57) ABSTRACT

A computer system comprises a communications module; a processor coupled to the communications module; and a memory coupled to the processor, the memory storing processor-executable instructions which, when executed, configure the processor to receive, via the communications module, a signal that includes an ownership key associated with a digital asset minted on a payment card network; store the ownership key associated with the digital asset in a digital wallet; send, via the communications module and to the payment card network, a signal that includes a request to perform an action on the digital asset using the ownership key; receive, via the communications module and from the payment card network, a signal that indicates permission for the action to be performed on the digital asset; and perform the action.

20 Claims, 5 Drawing Sheets

(56)           References Cited

U.S. PATENT DOCUMENTS

| | | | |
|---|---|---|---|
| 2023/0144857 A1* | 5/2023 | Khan | H04L 9/30 |
| | | | 713/168 |
| 2023/0259936 A1* | 8/2023 | Roffey | G06Q 20/40 |
| 2023/0266930 A1* | 8/2023 | Baker et al. | G06F 3/126 |
| 2024/0020661 A1* | 1/2024 | Strealy | G06Q 20/10 |

OTHER PUBLICATIONS

Entrust; Instant Financial Card Issuance—Instant Purchasing Power; Published in Entrust; https://www.entrust.com/issuance-systems/instant/financial-card; Accessed Jun. 3, 2022.

\* cited by examiner

100

500

Receiving a signal that includes an
ownership key associated with a
digital asset minted on a payment card
network and storing the ownership
key associated with the digital asset in
a digital wallet

510

Sending, to the payment card
network, a signal that includes a
request to perform an action on the
digital asset using the ownership key

520

Receiving, from the payment card
network, a signal that indicates
permission for the action to be
performed on the digital asset

530

Performing the action

Obtain characteristics of a physical
representation of a digital asset

610

Send, to the network, the
characteristics of the physical
representation of the digital asset

620

Determine that the physical
representation of the digital asset is
fraudulent

630

SYSTEMS AND METHODS FOR PERFORMING AN ACTION ON A DIGITAL ASSET

TECHNICAL FIELD

The present disclosure relates to systems and methods for performing an action on a digital asset.

BACKGROUND

A blockchain network may handle the creation and transfer of digital assets. In some cases, the digital asset may include a token that corresponds to a real-world asset or item.

It is often difficult to manage and track these real-world assets or items.

BRIEF DESCRIPTION OF THE DRAWINGS

Embodiments are described in detail below, with reference to the following drawings:

FIG. 5 is a flowchart showing operations performed in performing an action on a digital asset according to an embodiment.

Like reference numerals are used in the drawings to denote like elements and features.

DETAILED DESCRIPTION OF VARIOUS EMBODIMENTS

Figure 1:
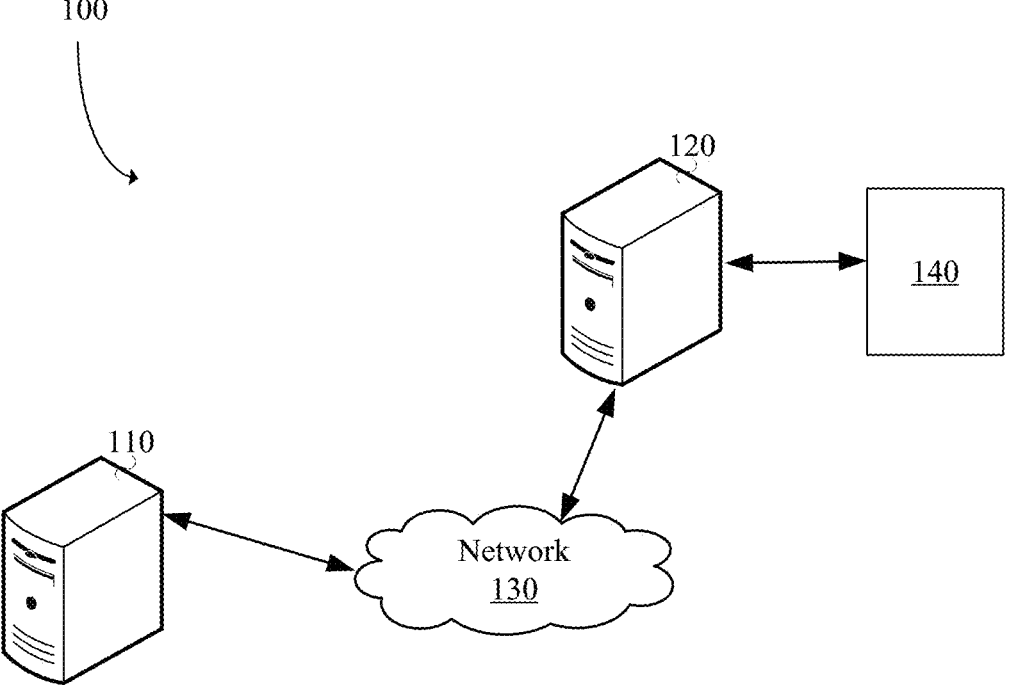
FIG. 1 is a schematic operation diagram illustrating an operating environment of an example embodiment.

Accordingly, in an aspect there is provided a computer system comprising a communications module; a processor coupled to the communications module; and a memory coupled to the processor, the memory storing processor-executable instructions which, when executed, configure the processor to receive, via the communications module, a signal that includes an ownership key associated with a digital asset minted on a payment card network; store the ownership key associated with the digital asset in a digital wallet; send, via the communications module and to the payment card network, a signal that includes a request to perform an action on the digital asset using the ownership key; receive, via the communications module and from the payment card network, a signal that indicates permission for the action to be performed on the digital asset; and perform the action.

In one or more embodiments, the action includes printing a physical representation of the digital asset.

In one or more embodiments, the processor-executable instructions, when executed, further configure the processor to engage a printer to print the physical representation of the digital asset; and send, via the communications module and to the payment card network, a signal that includes metadata identifying the printer used to print the physical representation of the digital asset.

In one or more embodiments, the processor-executable instructions, when executed, further configure the processor to send, via the communications module and to the payment card network, a signal that includes metadata associated with the action performed on the digital asset.

In one or more embodiments, the processor-executable instructions, when executed, further configure the processor to send, via the communications module and to the payment card network, a signal that includes a digital address of the digital wallet.

In one or more embodiments, the processor-executable instructions, when executed, further configure the processor to assign the ownership key associated with the digital asset to a delegate digital wallet; and send, via the communications module and to the payment card network, a signal that includes a digital address of the delegate digital wallet.

In one or more embodiments, the digital asset is minted by a payment card provider and includes specifications defining one or more characteristics of a physical representation of the digital asset.

In one or more embodiments, the action includes printing the physical representation of the digital asset according to the one or more characteristics.

In one or more embodiments, the payment card network includes a blockchain network.

In one or more embodiments, the signal that includes the request to perform the action includes the ownership key associated with the digital asset, a digital address of the digital wallet that stores the ownership key, and a digital address of a device that is to be used to perform the action.

According to another aspect there is provided a computer-implemented method comprising receiving, via a communications module, a signal that includes an ownership key associated with a digital asset minted on a payment card network; storing the ownership key associated with the digital asset in a digital wallet; sending, via the communications module and to the payment card network, a signal that includes a request to perform an action on the digital asset using the ownership key; receiving, via the communications module and from the payment card network, a signal that indicates permission for the action to be performed on the digital asset; and performing the action.

In one or more embodiments, the action includes printing a physical representation of the digital asset.

In one or more embodiments, the method further comprises engaging a printer to print the physical representation of the digital asset; and sending, via the communications module and to the payment card network, a signal that includes metadata identifying the printer used to print the physical representation of the digital asset.

In one or more embodiments, the method further comprises sending, via the communications module and to the payment card network, a signal that includes metadata associated with the action performed on the digital asset.

In one or more embodiments, the method further comprises sending, via the communications module and to the payment card network, a signal that includes a digital address of the digital wallet.

In one or more embodiments, the method further comprises assigning the ownership key associated with the digital asset to a delegate digital wallet; and sending, via the communications module and to the payment card network, a signal that includes a digital address of the delegate digital wallet.

In one or more embodiments, the digital asset is minted by a payment card provider and includes specifications defining one or more characteristics of a physical representation of the digital asset.

In one or more embodiments, the action includes printing the physical representation of the digital asset according to the one or more characteristics.

In one or more embodiments, the signal that includes the request to perform the action includes the ownership key associated with the digital asset, a digital address of the digital wallet that stores the ownership key, and a digital address of a device that is to be used to perform the action.

According to another aspect there is provided a non-transitory computer-readable storage medium storing instructions that when executed by a processor of a computing system cause the computing system to receive, via a communications module, a signal that includes an ownership key associated with a digital asset minted on a payment card network; store the ownership key associated with the digital asset in a digital wallet; send, via the communications module and to the payment card network, a signal that includes a request to perform an action on the digital asset using the ownership key; receive, via the communications module and from the payment card network, a signal that indicates permission for the action to be performed on the digital asset; and perform the action.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, examples involving a general-purpose computer, aspects of the disclosure transform the general-purpose computer into a special-purpose computing device when configured to execute the instructions described herein.

In the present application, a "digital asset" refers to one or more assets that are in digital format and that come with the right to use. A digital asset is self-contained, uniquely identifiable, and is associated with a defined value or ability to use. Examples of digital assets include, among others, digital documents, multimedia files (e.g., photos, audiovisual media, animations, etc.), electronic mails, websites, cryptocurrencies, digital wallets, asset-backed tokens, non-fungible tokens, etc.

FIG. 1 is a schematic operation diagram illustrating an operating environment of an example embodiment of a system 100 for sending an indication that a digital receipt is to be provided for a purchase made on a payment card.

As shown in FIG. 1, the system 100 includes a server computer system 110 and a computer system 120 coupled to one another through a network 130. The server computer system 110 and the computer system 120 may be in geographically disparate locations. Put differently, the server computer system 110 and the computer system 120 may be located remote from one another.

The server computer system 110 is a computer server system. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, computer servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The server computer system 110 may be associated with a payment card provider. The server computer system 110 may have resident thereon a digital wallet that allows for interacting with the blockchain. The digital wallet may allow the server computer system 110 to mint one or more digital assets and to transfer ownership keys to one or more digital wallets resident on computer systems that are associated with financial institutions.

The computer system 120 is a computing device such as for example a personal computer, a laptop computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The computer system 120 may be associated with a financial institution. The computer system 120 may have resident thereon include a digital wallet. The digital wallet may be a standalone mobile application, a web application accessible via a web browser, or a desktop application. The digital wallet is an application that may be used to store and transfer various types of data such as for example ownership keys (e.g., public and/or private keys) that may be used to access one or more digital assets.

Although not shown, the computer system 120 may be connected to one or more other computer systems that may also have resident thereon a digital wallet. The computer system 120 may be connected to the one or more other computer systems through the network 130 and/or through a private network such as for example an intranet. The computer system 120 may assign or delegate one or more ownership keys to a delegate digital wallet that is resident on the one or more other computer systems.

The computer system 120 may be connected to a device 140. The computer system 120 may be connected to the device 140 via the network 130 and/or through a private network such as for example an intranet. As will be described in more detail below, the device 140 may include a device that is used to perform an action on a digital asset.

Figure 2:
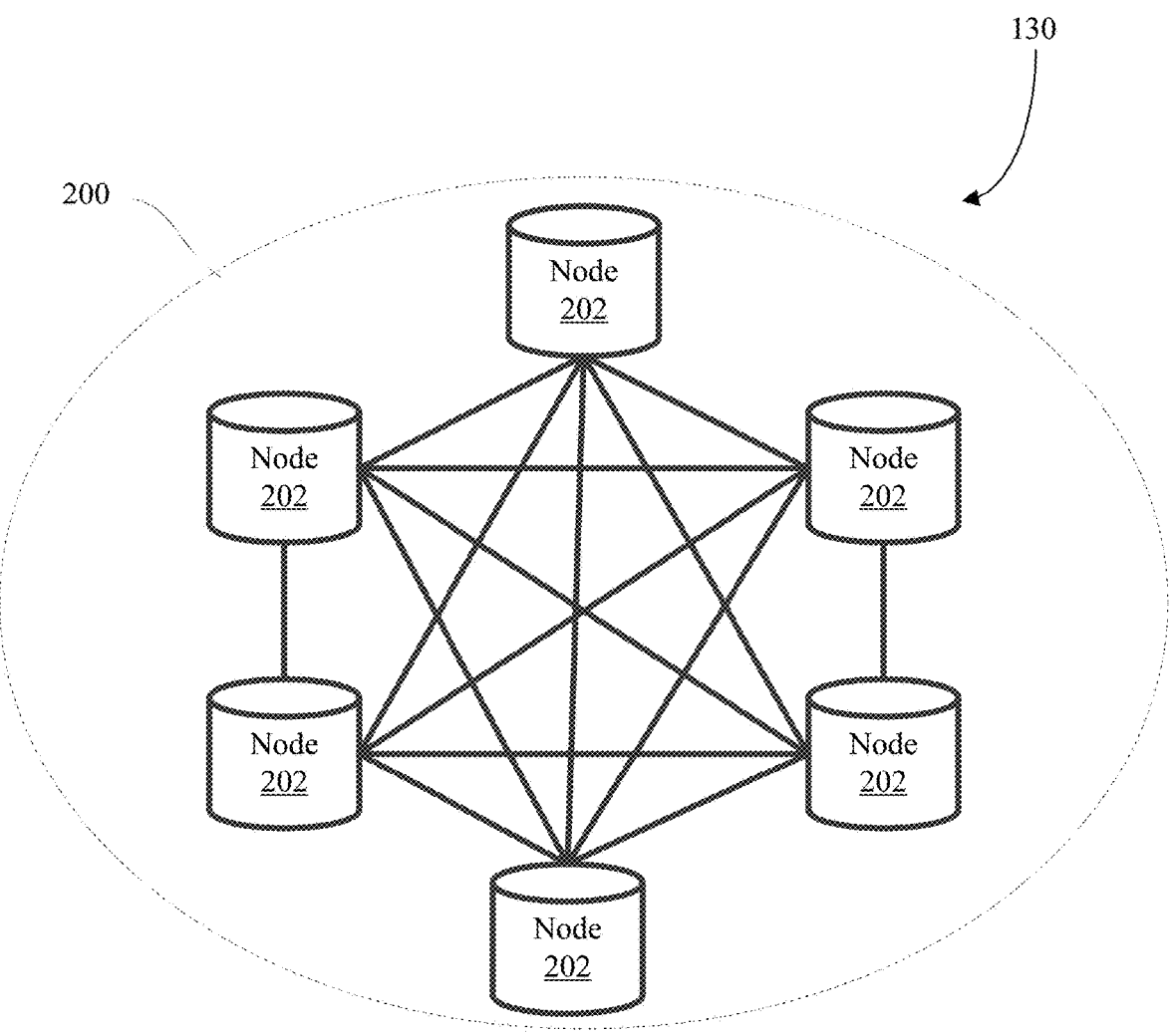
FIG. 2 is a simplified schematic diagram of a blockchain network.

The network 130 is a computer network and may be referred to as a payment card network. As shown in FIG. 2, the network 130 may include a blockchain network 200. The blockchain network 200 may be created by, for example, the server computer system 110. Distributed electronic devices running an instance of the blockchain protocol under which the blockchain network 200 operates may participate in the blockchain network 200. Such distributed electronic devices may be referred to as nodes 202. As examples, the blockchain protocol may be Ethereum, Bitcoin, or another blockchain protocol.

The electronic devices that run the blockchain protocol and that form the nodes 202 of the blockchain network 200 may be of various types including, for example, computers such as desktop computers, laptop computers, tablet computers, servers, mobile devices such as smartphones, wearable computers such as smart watches or other electronic devices.

Nodes 202 of the blockchain network 200 are coupled to one another using suitable communication technologies which may include wired and wireless communication technologies. In many cases, the blockchain network 200 is implemented at least partly over the Internet, and some of the nodes 202 may be located in geographically dispersed locations.

Nodes 202 maintain a global ledger of all transactions on the blockchain, grouped into blocks, each of which contains a hash of the previous block in the chain. The global ledger is a distributed ledger and each node 202 may store a complete copy or a partial copy of the global ledger. Transactions propagated on the network are verified by other nodes 202 prior to inclusion in a mined block so that the validity of the global ledger is maintained. The details of implementing and operating a blockchain network, such as one using the Ethereum protocol, will be appreciated by those ordinarily skilled in the art.

Each transaction may include one or more inputs and one or more outputs. Scripts may be embedded into the inputs and outputs that specify how and by whom the outputs of the transactions can be used or transferred. The output of a transaction may be an address to which a digital asset is assigned as a result of the transaction. The address may include the address of a digital wallet. In some implementations, that digital asset is then associated with that output address, for example as an unspent transaction output (UTXO). A subsequent transaction may then reference that address as an input in order to transfer or otherwise use that digital asset. In some cases, like Ethereum, code in the form of smart contracts may be deployed on the blockchain and may be called or referenced by later transactions to cause the network to execute that code. In this manner, a transaction may cause the network to carry out certain functions, such as the generation (minting) of a digital asset or validating and effecting the transfer of a digital asset from one owner address to a new owner address.

Nodes 202 can fulfill numerous different functions, from network routing to wallet services, to maintaining a robust and secure decentralized public ledger. In some implementations, "full nodes" contain a complete and up-to-date copy of the blockchain, and can therefore verify any transactions (spent or unspent) on the public ledger. "Lightweight nodes" (sometimes referred to as simplified payment verification (SPV) in Bitcoin) do not include a copy of the blockchain but can validate transactions and confirm inclusion of a transaction in a particular block by using a Merkle proof. In some cases, lightweight nodes only download the headers of blocks, and not the transactions within each block. "Mining nodes" engage in the proof-of-work (or proof-of-stake in some cases) activity to race to validate a candidate block and propagate the solution on the network, thereby building the blockchain. Nodes 202 may communicate with each other using a connection-oriented protocol, such as TCP/IP (Transmission Control Protocol).

The blockchain network 200 may store digital assets and metadata associated with the digital assets. The digital assets are unique and have blockchain-based authenticity, ownership, and transferability features. The unique identity and ownership of a digital asset is verifiable using the blockchain ledger. Any actions performed on the digital assets may be recorded as metadata and as such any actions performed on a digital asset may be tracked and/or verified.

Figure 3:
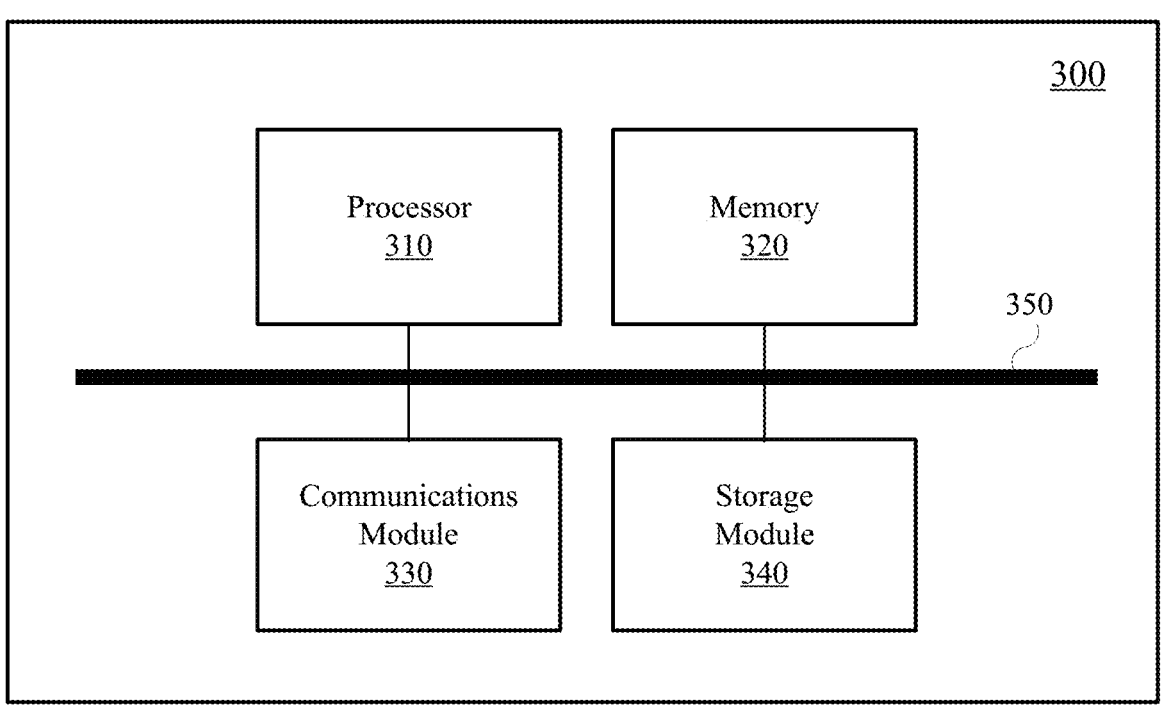
FIG. 3 is a high-level schematic diagram of an example computer device.

Referring now to FIG. 3, a high-level operation diagram of an example computer device 300 is shown. In some embodiments, the computer device 300 may be exemplary of the server computer system 110 (FIG. 1) and/or the computer system 120 (FIG. 1).

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
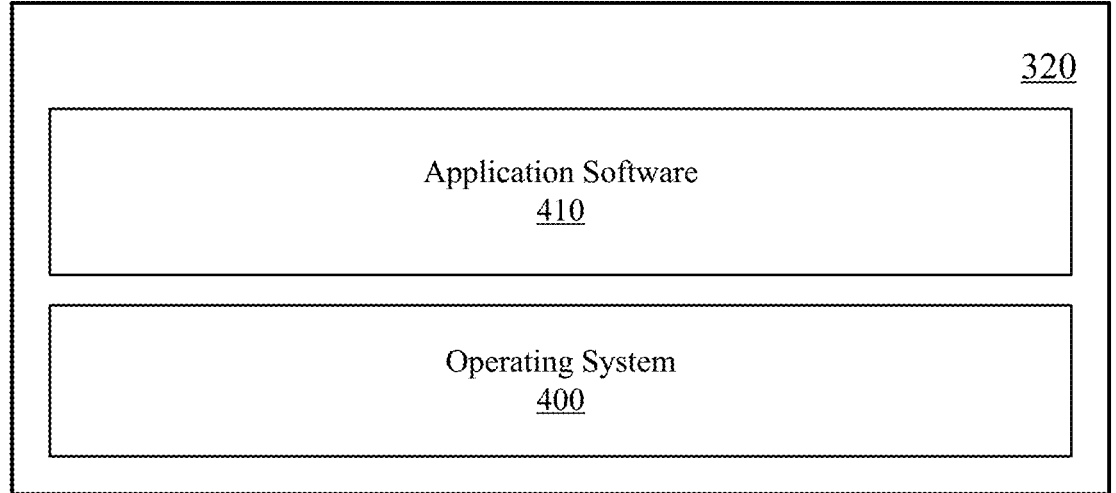
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the server computer system 110 (FIG. 1) and/or the computer system 120 (FIG. 1).

While a single application 410 is illustrated in FIG. 3, in operation the memory 320 may include more than one application 410 and different applications 410 may perform different operations. For example, in at least some embodiments in which the computer device 300 is functioning as the computer system 120, the applications 410 may include a digital wallet application. The digital wallet is an application that may be used to store and transfer various types of data such as for example ownership keys (e.g., public and/or private keys) that may be used to access one or more digital assets that may be stored on, for example, the blockchain network 200.

In one or more embodiments, the server computer system 110 mints digital assets which are then stored on a payment card network which may include a blockchain network. "Minting" a digital asset includes converting a digital file into a digital asset and storing the digital asset on the payment card network. Once stored, an ownership key associated with the digital asset is created or obtained. The ownership key is used to access the digital asset on the payment card network. The ownership key may include or may be referred to as a private key.

In one or more embodiments, the digital asset may include specifications that define one or more characteristics of a physical representation of the digital asset. For example, the physical representation of the digital asset may include a physical payment card and as such the specifications may define characteristics such as for example a size of the physical payment card, a design of the physical payment card (colours, logos, etc.), a card number of the physical payment card, etc.

In one or more embodiments, one or more of the specifications may be pre-defined by the computer system 120. For example, the computer system 120 may be associated with a financial institution and as such specifications such as for example the design of the physical payment card may be based on a design created by the financial institution. In this example, the server computer system 110 may store a template digital file that includes the design of the physical payment card and this may be used to generate the digital file prior to minting the digital asset for the financial institution.

In one or more embodiments, the digital asset may include instructions that, when executed by a processor of a device, cause the device to perform an action. For example, the digital asset may include instructions that, when executed by a processor of a three-dimensional printer, cause the three-dimensional printer to perform operations to print a physical representation of the digital asset.

In one or more embodiments, the digital asset may be minted by the server computer system 110 at the request of the computer system 120. For example, the financial institution associated with the computer system 120 may require that one or more digital assets be minted by the server computer system 110 and in response the server computer system 110 may mint the requested digital assets.

Once a digital asset has been minted, operations may be performed to perform an action on the digital asset.

Reference is made to FIG. 5 which illustrates, in flowchart form, a method 500 for performing an operation on a digital asset. The method 500 may be implemented by a computing device having suitable processor-executable instructions for causing the computing device to carry out the described operations. The method 500 may be implemented, in whole or in part, by the computer system 120.

The method 500 includes receiving a signal that includes an ownership key associated with a digital asset minted on a payment card network and storing the ownership key associated with the digital asset in a digital wallet (step 510).

The ownership key may include, for example, a hash or a private key that may be used to access the digital asset.

In one or more embodiments, the signal that includes the ownership key associated with the digital asset minted on the payment card network may be received from the server computer system 110. In this embodiment, responsive to minting the digital asset on the payment card network, the server computer system 110 may obtain the ownership key associated with the digital asset within the digital wallet resident thereon. The server computer system 110 may transfer the ownership key to the digital wallet resident on the computer system 120 and this may be done using, for example, a digital address of the digital wallet resident on the computer system 120.

The payment card network may record the transfer. For example, the computer system 120 and/or the server computer system 110 may send a signal that includes a digital address of the digital wallet resident on the computer system 120. The payment card network may store or indicate the digital address of the digital wallet of the computer system 120 as the owner of the digital asset.

In one or more embodiments, the signal that includes the ownership key associated with the digital asset minted on the payment card network may be received from the payment card network. In this embodiment, responsive to storing the digital asset on the payment card network, the payment card network may assign the digital asset to the digital wallet resident on the computer system 120 and this may be done using, for example, a digital address of the digital wallet resident on the computer system 120. The digital address may be provided to the payment card network by, for example, the server computer system 110.

Responsive to receiving the ownership key, the computer system 120 stores the ownership key in the digital wallet.

The method 500 includes sending, to the payment card network, a signal that includes a request to perform an action on the digital asset using the ownership key (step 520).

In one or more embodiments, an action may be performed on the digital asset. Prior to performing the action, the computer system 120 may require permission to perform the action on the digital asset. As such, the computer system 120 may send a signal that includes a request to perform an action on the digital asset using the ownership key. The signal includes the ownership key itself and this is provided as proof that the computer system 120 is the owner of the digital asset.

In one or more embodiments, the signal that includes the request to perform the action on the digital asset may additionally include a digital address of the digital wallet that stores the ownership key and a digital address of a device that is to be used to perform the action.

In one or more embodiments, the action to be performed on the digital asset may include printing a physical representation of the digital asset.

The method 500 includes receiving, from the payment card network, a signal that indicates permission for the action to be performed on the digital asset (step 530).

Responsive to receiving the signal that includes the request to perform the action on the digital asset, the payment card network may perform one or more checks prior to granting permission. The one or more checks may include determining that the ownership key is the correct ownership key of the digital asset, determining that the digital address of the digital wallet matches the digital address of the owner of the digital address that is recorded or stored on the payment card network, determining that the digital address of the device that is to be used to perform the action has not been flagged as a bad actor, and/or determining that the digital address of the digital wallet has not been flagged as a bad actor.

In the event one or more of the checks performed by the payment card network fail, the payment card network may reject the request and the computer system 120 may receive a signal that indicates the rejection. The signal may additionally indicate the reason for the rejection.

In the event all of the checks performed by the payment card network are successful, the payment card network may send the signal that indicates permission for the action to be performed on the digital asset and may perform operations to allow or enable the action to be performed on the digital asset.

It will be appreciated that the payment card network may consult or offload some of the operations required to perform the one or more checks to the server computer system 110.

The method 500 includes performing the action (step 540).

Responsive to receiving the signal that indicates permission for the action to be performed on the digital asset, the computer system 120 performs the action.

In one or more embodiments, the computer system 120 may engage the device 140 to perform the action. For example, the action may include printing a physical representation of the digital asset and the device 140 may be a printer. As such, the computer system 120 may engage the printer to print the physical representation of the digital asset.

As mentioned, in one or more embodiments the digital asset may include specifications defining one or more characteristics of a physical representation of the digital asset. As such, the computer system 120 may cause the printer to print the physical representation of the digital asset according to the one or more characteristics.

In one or more embodiments, responsive to the action being performed on the digital asset, the computer system 120 may send a signal to the payment card network that includes data or metadata associated with the action performed on the digital asset. The data or metadata may be stored on the payment card network in association with the digital asset. For example, the data or metadata may be written as metadata of the digital asset.

As one example, the digital asset may include specifications defining one or more characteristics of a physical payment card. As such, the printer may print a physical payment card according to the one or more characteristics. The physical payment card may include a chip that may be programmed to include the one or more characteristics of the physical payment card.

In one or more embodiments, the printer may include a three-dimensional printer that may be located at a branch associated with the financial institution that is associated with the computer system 120. The three-dimensional printer itself may be connected to the payment card network and may include a digital address. Responsive to printing the physical representation of the digital asset, the digital address of the printer may be sent to the payment card network and written as metadata of the digital asset.

In one or more embodiments, the digital asset may include instructions that, when executed by a processor of a device, cause the device to perform an action. For example, the digital asset may include instructions that, when executed by a processor of a three-dimensional printer, cause the three-dimensional printer to perform operations to print a physical representation of the digital asset.

In one or more embodiments, wherein the digital asset includes one or more characteristics of a physical payment card, the digital asset may not include a payment card number. In these embodiments, the printer may engage or communicate with the server computer system 110 as the physical payment card is being printed and may, in real-time, receive the payment card number and may print the received payment card number on the physical payment card. Responsive to the physical payment card being printed, the printer and/or the server computer system 110 may send the payment card number to be written as metadata of the digital as set.

As mentioned, the ownership key associated with the digital asset may be stored in a digital wallet resident on the computer system 120. In one or more embodiments, the computer system 120 may assign the ownership key associated with the digital asset to a delegate digital wallet and may send, to the payment card network, a signal that includes a digital address of the delegate digital wallet. In these embodiments, the delegate digital wallet may be resident on a computer system that is associated with, for example, an employee of the financial institution.

In embodiments described herein, the network 130 is described as including a blockchain network 200. In one or more embodiments, the blockchain network 200 (or the payment card provider) may assign one or more blocks of the blockchain to a particular financial institution. For example, a particular number of blocks may be assigned to Financial Institution A. In this example, each time a digital asset is minted for the Financial Institution A, the digital asset may be stored on the blockchain on one of the blocks assigned to Financial Institution A. Only digital wallets that are known to be associated with Financial Institution A and that have the ownership key of a particular digital asset stored on a block associated with Financial Institution A may have read and action access to the digital asset. It will be appreciated that other financial institution may have, for example, read-only access to the blocks assigned to Financial Institution A. For example, Financial Institution B may have access to the blockchain but may have read-only access to any blocks on the blockchain associated with Financial Institution B. In this manner, a computer system associated with Financial Institution B may determine whether a particular physical payment card is fraudulent as will be described.

In one or more embodiments, the payment card provider may create multiple blockchains where each blockchain is associated with or assigned to a particular financial institution. In these embodiments, a particular financial institution may be provided read and action access to a particular blockchain and one or more other financial institutions may be assigned read-only access to the particular blockchain. In this manner, a computer system associated with the one or more other financial institutions may determine whether a particular physical payment card is fraudulent as will be described.

Figure 6:
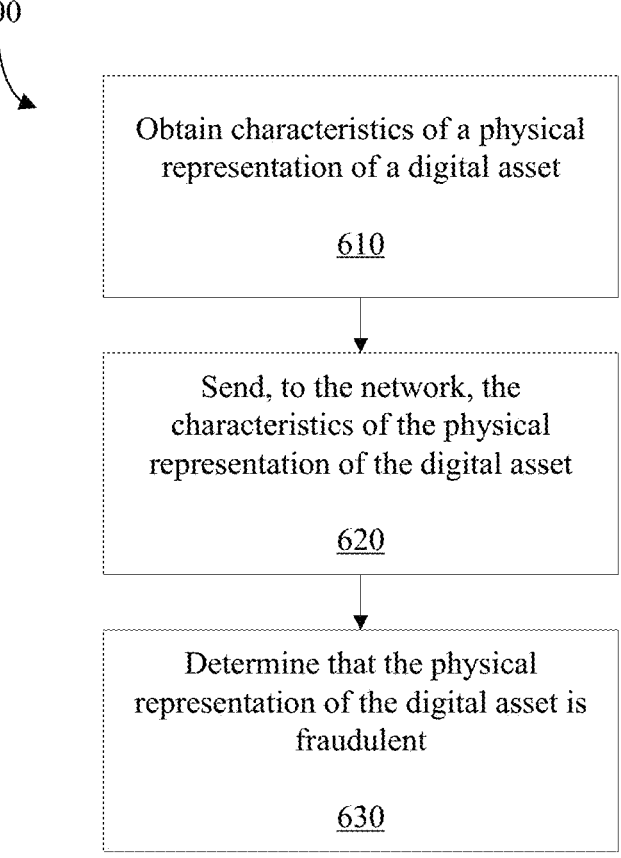
FIG. 6 is a flowchart showing operations performed in determining that a physical representation of a digital asset is fraudulent according to an embodiment.

Reference is made to FIG. 6 which illustrates, in flowchart form, a method 600 for determining that a physical representation of a digital asset is fraudulent. The method 600 may be implemented by a computing device having suitable processor-executable instructions for causing the computing device to carry out the described operations. The method 600 may be implemented, in whole or in part, by the computer system 120. Some of the operations may be offloaded or performed by, for example, the server computer system 110.

The method 600 includes obtaining one or more characteristics of a physical representation of a digital asset (step 610).

The computer system 120 may obtain characteristics of the physical representation of the digital asset.

For example, in embodiments where the physical representation of the digital asset is a physical payment card, the physical payment card may be inserted into an automated teller machine (ATM) and the ATM may obtain the characteristics of the physical payment card by, for example, scanning the physical payment card and/or reading the characteristics of the physical payment card from a chip included therewith. The characteristics may include an identifier such as a payment card number or digital address of a digital asset associated with the payment card. The ATM may communicate the characteristics to the computer system 120. The payment card may be associated with the same financial institution of the computer system 120 or may be associated with a different financial institution that is a member of the payment card network.

The method 600 includes sending, to the network, a signal that includes the characteristics of the physical representation of the digital asset (step 620).

The computer system 120 sends a signal that includes the characteristics of the physical representation of the digital asset. For example, in embodiments where the physical representation of the digital asset is a physical payment card, the characteristics may include an identifier of the payment card and as such the payment card network may identify the digital asset associated with the payment card using the identifier.

The method 600 includes determining that the physical representation of the digital asset is fraudulent (step 630).

The characteristics of the physical representation of the digital asset may be compared to the digital asset. For example, the characteristics of the physical payment card may be compared to those stored as the digital asset on the payment card network. Responsive to determining that the characteristics of the physical payment card do not match those stored as the digital asset on the payment card network, it may be determined that the physical payment card is fraudulent.

Responsive to determining that the physical representation of the digital asset is fraudulent, the server computer system 110 and/or the computer system 120 may perform one or more mitigation actions. For example, the digital address of the digital wallet that stores the ownership key of the digital asset may be flagged as a bad actor. In this example, it may be assumed that the ownership key used to perform the action on the digital asset was fraudulent. As another example, the digital address of the device that was used to perform an action on the digital asset may be flagged as a bad actor.

In embodiments where the physical representation of the digital asset includes a physical payment card, the mitigation actions may include cancelling or re-issuing all physical payment cards that were printed from a particular digital wallet (that is now flagged as a bad actor) and/or a particular device (that is now flagged as a bad actor) as it may be assumed that any physical payment cards printed from the particular digital wallet or from the particular device cannot be trusted. Other mitigation actions may include adjusting or updating the template file that was used to generate the digital asset.

It will be appreciated that the physical representation of the digital asset may include, for example, a digital address of the digital asset stored on the payment network. In one or more embodiments, each time a payment or transaction is conducted using the payment card, the payment or transaction may be written on the payment network in association with the digital address of the digital asset and as such all payments and transactions completed using the physical representation of the digital asset may be recorded.

In one or more embodiments described herein, the digital asset is described as including specifications defining one or more characteristics of a physical representation of the digital asset. It will be appreciated that the digital asset may additionally include specifications defining one or more security features of the physical representation of the digital asset. For example, the physical representation of the digital asset may include a physical payment card and the digital asset may define security features such as for example a machine-readable indicium that includes an identifier such as for example a hash or other security code that may be printed or included on the physical representation of the digital asset for verification. It will be appreciated that the hash or other security code may also be written as metadata associated with the digital asset and may be readable from the payment card network for verification.

Although in embodiments described herein the payment card network is described as including a blockchain network, it will be appreciated that other types of networks may be used. For example, the payment card network may be cloud-based and or more cloud-based platforms may be used to store the digital assets.

The methods described above may be modified and/or operations of such methods combined to provide other methods.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computer system comprising:

a communications module;

a processor coupled to the communications module; and a memory coupled to the processor, the memory storing processor-executable instructions which, when executed, configure the processor to:

receive, via the communications module, a signal that includes an ownership key associated with a digital asset minted on a payment card network, the ownership key required to access the digital asset;

store the ownership key associated with the digital asset in a digital wallet;

send, via the communications module and to the payment card network, a signal that includes a request to perform an action on the digital asset using the ownership key;

receive, via the communications module and from the payment card network, a signal that indicates permission for the action to be performed on the digital asset; and perform the action.

2. The computer system of claim 1, wherein the action includes printing a physical representation of the digital asset.

3. The computer system of claim 2, wherein the processor-executable instructions, when executed, further configure the processor to:

engage a printer to print the physical representation of the digital asset; and send, via the communications module and to the payment card network, a signal that includes metadata identifying the printer used to print the physical representation of the digital asset.

4. The computer system of claim 1, wherein the processor-executable instructions, when executed, further configure the processor to:

send, via the communications module and to the payment card network, a signal that includes metadata associated with the action performed on the digital asset.

5. The computer system of claim 1, wherein the processor-executable instructions, when executed, further configure the processor to:

send, via the communications module and to the payment card network, a signal that includes a digital address of the digital wallet.

6. The computer system of claim 1, wherein the processor-executable instructions, when executed, further configure the processor to:

assign the ownership key associated with the digital asset to a delegate digital wallet; and send, via the communications module and to the payment card network, a signal that includes a digital address of the delegate digital wallet.

7. The computer system of claim 1, wherein the digital asset is minted by a payment card provider and includes specifications defining one or more characteristics of a physical representation of the digital asset.

8. The computer system of claim 7, wherein the action includes printing the physical representation of the digital asset according to the one or more characteristics.

9. The computer system of claim 1, wherein the payment card network includes a blockchain network.

10. The computer system of claim 1, wherein the signal that includes the request to perform the action includes the ownership key associated with the digital asset, a digital address of the digital wallet that stores the ownership key, and a digital address of a device that is to be used to perform the action.

11. A computer-implemented method comprising:

receiving, via a communications module, a signal that includes an ownership key associated with a digital asset minted on a payment card network, the ownership key required to access the digital asset;

storing the ownership key associated with the digital asset in a digital wallet;

sending, via the communications module and to the payment card network, a signal that includes a request to perform an action on the digital asset using the ownership key;

receiving, via the communications module and from the payment card network, a signal that indicates permission for the action to be performed on the digital asset; and performing the action.

12. The computer-implemented method of claim 11, wherein the action includes printing a physical representation of the digital asset.

13. The computer-implemented method of claim 12, further comprising:

engaging a printer to print the physical representation of the digital asset; and sending, via the communications module and to the payment card network, a signal that includes metadata identifying the printer used to print the physical representation of the digital asset.

14. The computer-implemented method of claim 11, further comprising:

sending, via the communications module and to the payment card network, a signal that includes metadata associated with the action performed on the digital asset.

15. The computer-implemented method of claim 11, further comprising:

sending, via the communications module and to the payment card network, a signal that includes a digital address of the digital wallet.

16. The computer-implemented method of claim 11, further comprising:

assigning the ownership key associated with the digital asset to a delegate digital wallet; and sending, via the communications module and to the payment card network, a signal that includes a digital address of the delegate digital wallet.

17. The computer-implemented method of claim 11, wherein the digital asset is minted by a payment card provider and includes specifications defining one or more characteristics of a physical representation of the digital asset.

18. The computer-implemented method of claim 17, wherein the action includes printing the physical representation of the digital asset according to the one or more characteristics.

19. The computer-implemented method of claim 11, wherein the signal that includes the request to perform the action includes the ownership key associated with the digital asset, a digital address of the digital wallet that stores the ownership key, and a digital address of a device that is to be used to perform the action.

20. A non-transitory computer-readable storage medium storing instructions that when executed by a processor of a computing system cause the computing system to:

receive, via a communications module, a signal that includes an ownership key associated with a digital asset minted on a payment card network, the ownership key required to access the digital asset;

store the ownership key associated with the digital asset in a digital wallet;

send, via the communications module and to the payment card network, a signal that includes a request to perform an action on the digital asset using the ownership key;

receive, via the communications module and from the payment card network, a signal that indicates permission for the action to be performed on the digital asset; and perform the action.

* * * * *